(12) United States Patent
Dini et al.

(10) Patent No.: US 12,429,124 B2
(45) Date of Patent: Sep. 30, 2025

(54) HARMONIC DRIVE WITH COMPACT STRUCTURE MADE BY PLASTIC MATERIAL

(71) Applicant: ERGOTECH S.R.L., Settimo Vittone (IT)

(72) Inventors: Maurizio Dini, Settimo Vittone (IT); Gabriele Gaida, Settimo Vittone (IT); Gabriele Peretto, Settimo Vittone (IT)

(73) Assignee: ERGOTECH S.R.L., Settimo Vittone (IT)

( * ) Notice: Subject to any disclaimer, the term of this patent is extended or adjusted under 35 U.S.C. 154(b) by 0 days.

(21) Appl. No.: 18/707,819

(22) PCT Filed: Nov. 24, 2022

(86) PCT No.: PCT/IT2022/050300
§ 371 (c)(1),
(2) Date: May 6, 2024

(87) PCT Pub. No.: WO2023/095179
PCT Pub. Date: Jun. 1, 2023

(65) Prior Publication Data
US 2025/0012348 A1 Jan. 9, 2025

(30) Foreign Application Priority Data
Nov. 26, 2021 (IT) .......................... 102021000030044

(51) Int. Cl.
F16H 49/00 (2006.01)
(52) U.S. Cl.
CPC ..... *F16H 49/001* (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS

| 2,943,508 A | 7/1960 | Walton |
|---|---|---|
| 6,202,509 B1 | 3/2001 | Dold |

(Continued)

FOREIGN PATENT DOCUMENTS

| CN | 108115658 A | 6/2018 |
|---|---|---|
| CN | 109623819 A | 4/2019 |

(Continued)

OTHER PUBLICATIONS

International Preliminary Report on Patentability for PCT/IT2022/050300 filed on Nov. 24, 2022 on behalf of Ergotech S.R.L. Mail Date: Mar. 6, 2024 66 pages.

(Continued)

*Primary Examiner* — Bobby Rushing, Jr.
(74) *Attorney, Agent, or Firm* — Steinfl + Bruno LLP

(57) ABSTRACT

A harmonic reducer includes an outer shell, a circular spline, a flex spline, a wave generator, and an electric motor. The circular spline, flex spline, and wave generator are housed in the outer shell. The electric motor controls rotation of the wave generator around an axis of the harmonic reducer. The circular spline, the flex spline, and support body of the wave generator are made by injection molding of a plastic material. The circular spline consists of a first fixed circular spline and a second mobile or movable circular spline, integral with a user of the harmonic reducer, each having respective internal toothing. The wave generator has two groups of rotating bearings, arranged in diametrically opposite areas of the wave generator.

5 Claims, 10 Drawing Sheets

(56) References Cited

U.S. PATENT DOCUMENTS

| | | |
|---|---|---|
| 6,736,028 B2 | 5/2004 | Ruttor et al. |
| 8,776,638 B2 | 7/2014 | Ishikawa |
| 10,883,592 B2 | 1/2021 | Shirokoshi |
| 2003/0089194 A1 | 5/2003 | Ruttor et al. |
| 2017/0321790 A1 | 11/2017 | Klassen et al. |
| 2019/0160654 A1* | 5/2019 | Moritani ................. B25J 18/00 |
| 2020/0072318 A1* | 3/2020 | Shirouzu ............... F16H 49/001 |
| 2021/0138667 A1 | 5/2021 | Kassow |
| 2021/0354348 A1* | 11/2021 | Tamura ................... F16H 55/06 |

FOREIGN PATENT DOCUMENTS

| | | | |
|---|---|---|---|
| CN | 110030359 A | 7/2019 | |
| CN | 110259891 A * | 9/2019 | ............... F16H 1/32 |
| DE | 102019103693 A1 * | 9/2019 | ............... B25J 9/102 |
| DE | 102020212905 B3 * | 11/2021 | ............ B62M 21/00 |
| EP | 1261814 B1 | 4/2004 | |
| JP | 2667209 B2 * | 10/1997 | |
| JP | 2003284317 A * | 10/2003 | |
| JP | 2019217573 A * | 12/2019 | ............. B25J 17/00 |
| JP | 2020016278 A * | 1/2020 | ............. F16C 19/28 |
| KR | 20070070654 A | 7/2007 | |
| KR | 20110124681 A | 11/2011 | |
| KR | 20120045779 A | 5/2012 | |
| KR | 102321140 B1 * | 11/2021 | |
| SU | 1477961 A1 | 5/1989 | |
| WO | 2012/060609 A1 | 5/2012 | |
| WO | 2018/000995 A1 | 1/2018 | |
| WO | 2020/074039 A1 | 4/2020 | |
| WO | WO-2020217562 A1 * | 10/2020 | ............. F01L 1/022 |
| WO | 2021/098903 A1 | 5/2021 | |
| WO | WO-2021193244 A1 * | 9/2021 | ........... F16H 49/001 |
| WO | 2023/095179 A1 | 6/2023 | |

OTHER PUBLICATIONS

International Search Report and Written Opinion for PCT/IT2022/050300 filed on Nov. 24, 2022 on behalf of Ergotech S.R.L. Mail Date: Mar. 3, 2023 13 pages.

\* cited by examiner

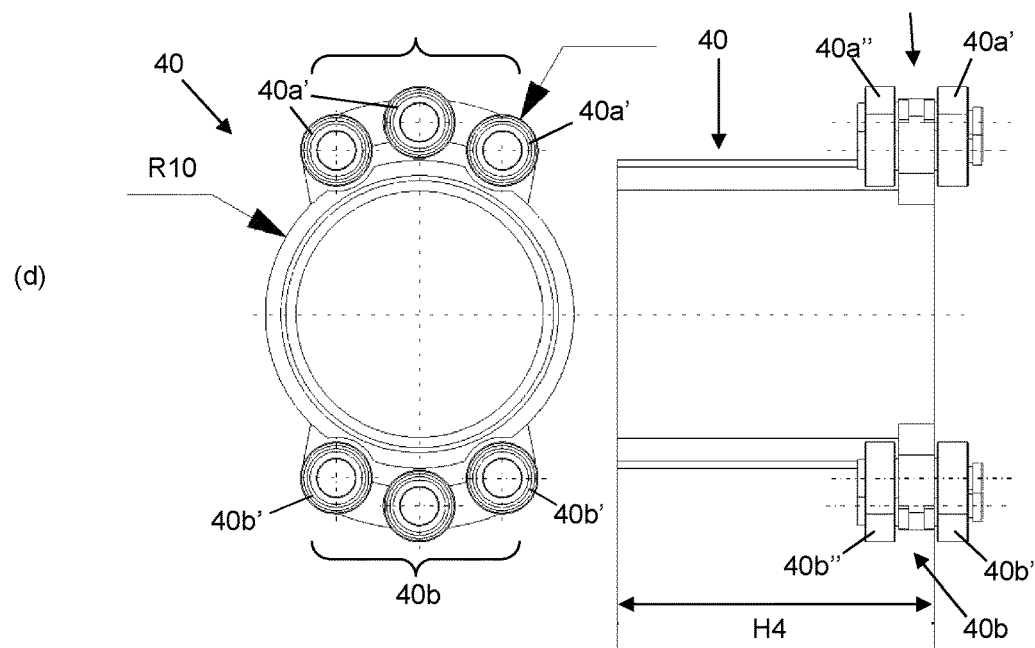
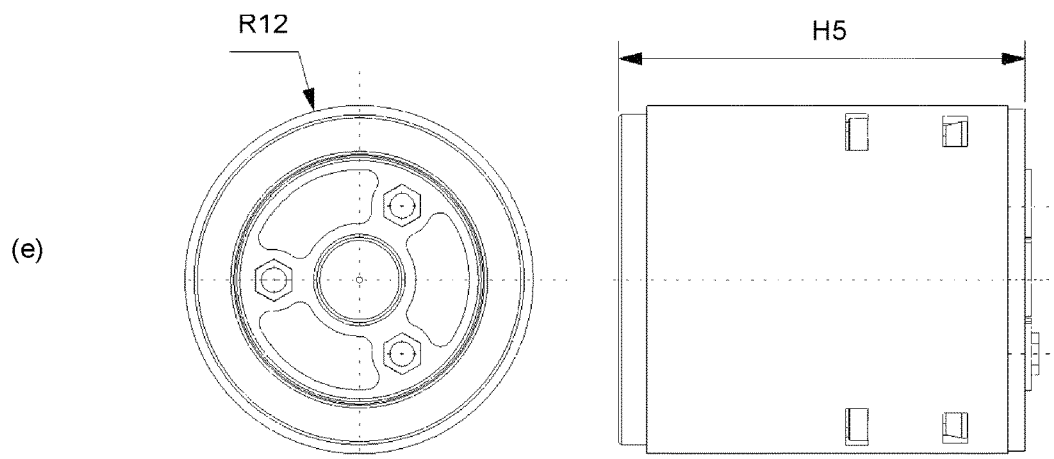
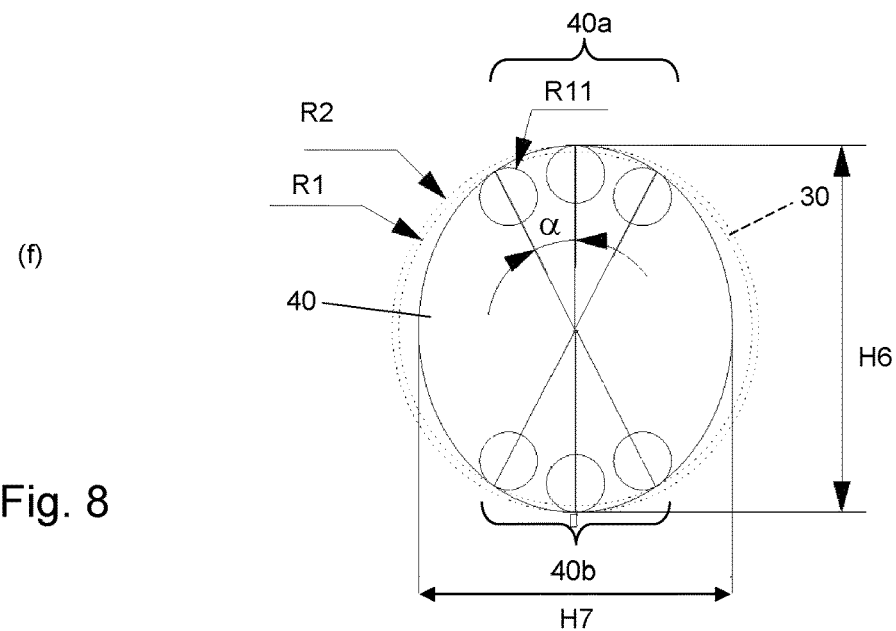
Fig. 8

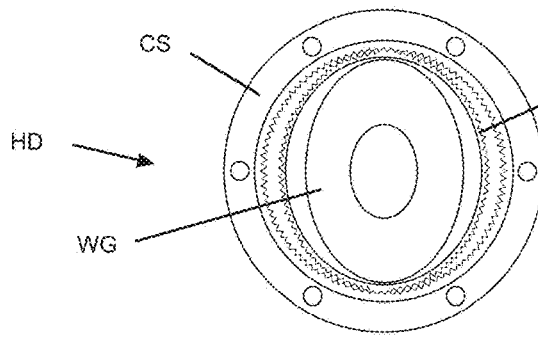
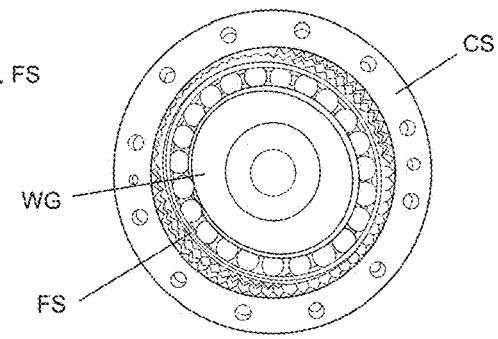
Fig. 10A - PRIOR ART    Fig. 10B - PRIOR ART
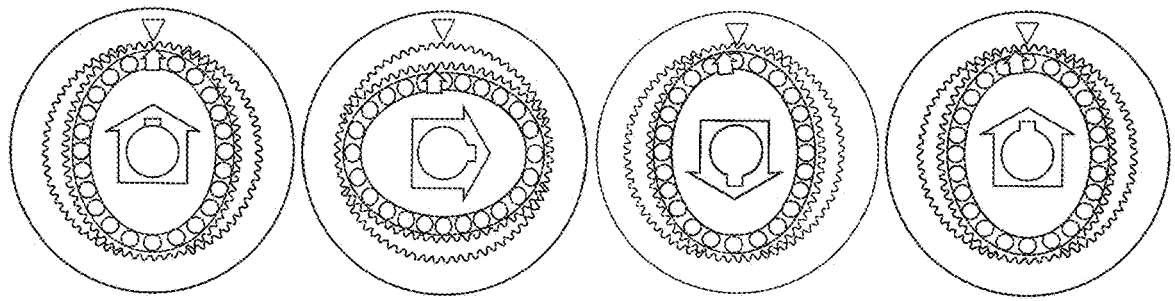
Fig. 10C - PRIOR ART
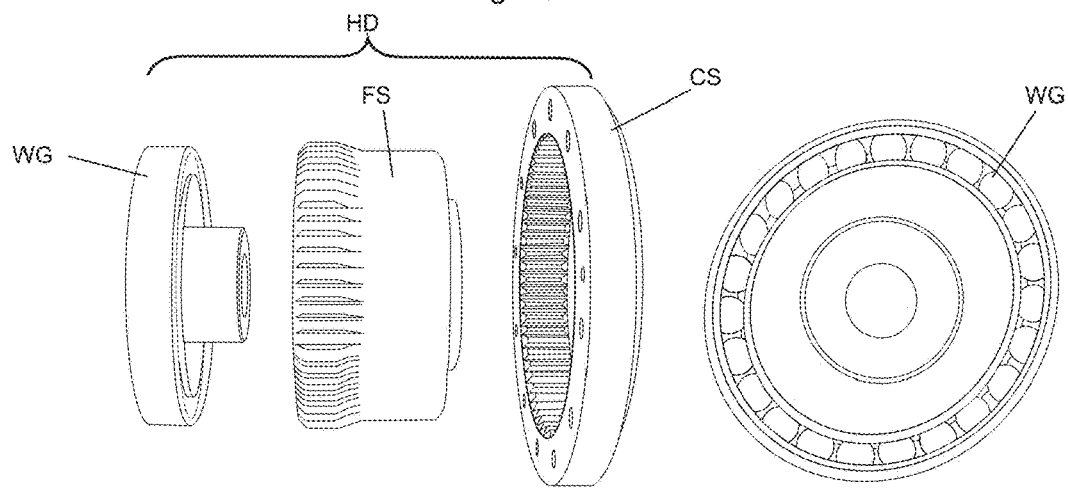
Fig. 10D - PRIOR ART    Fig. 10E - PRIOR ART
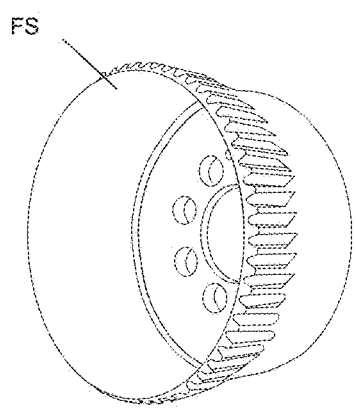
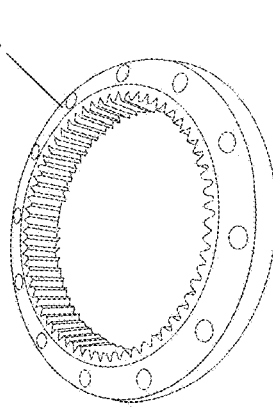
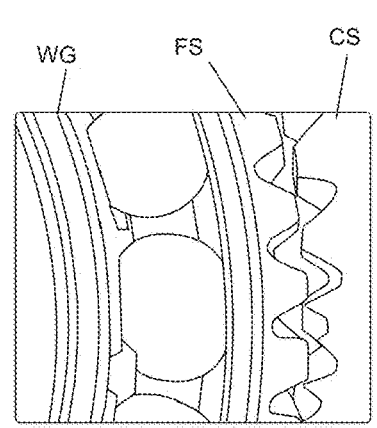
Fig. 10F - PRIOR ART    Fig. 10G - PRIOR ART    Fig. 10H - PRIOR ART

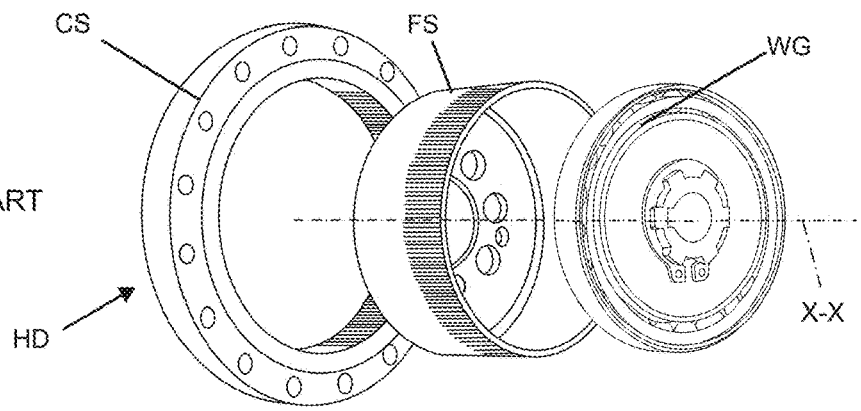
Fig. 10I - PRIOR ART
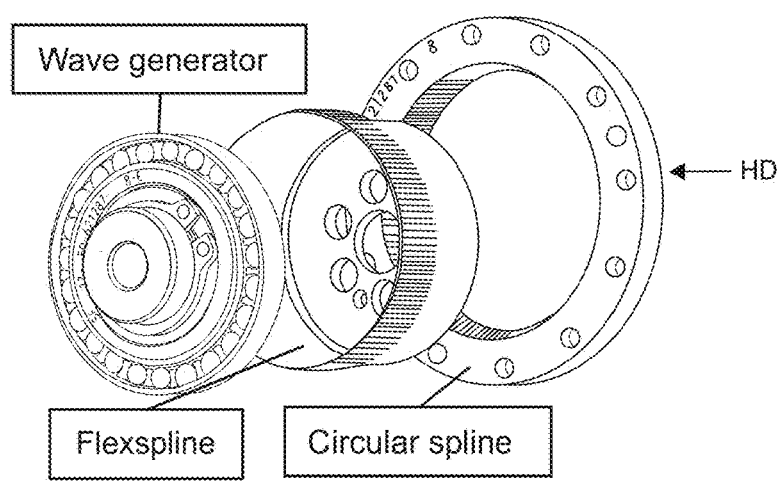
Fig. 10J - PRIOR ART
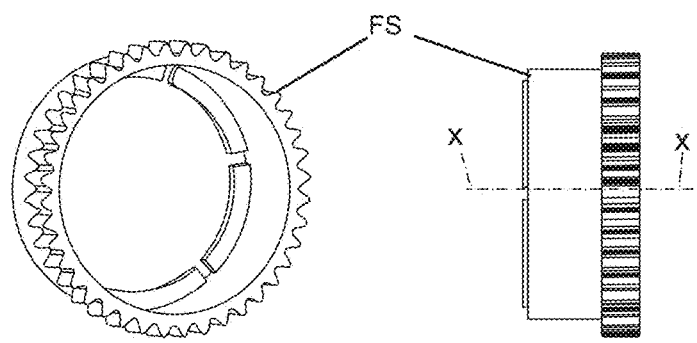
Fig. 10 K - PRIOR ART
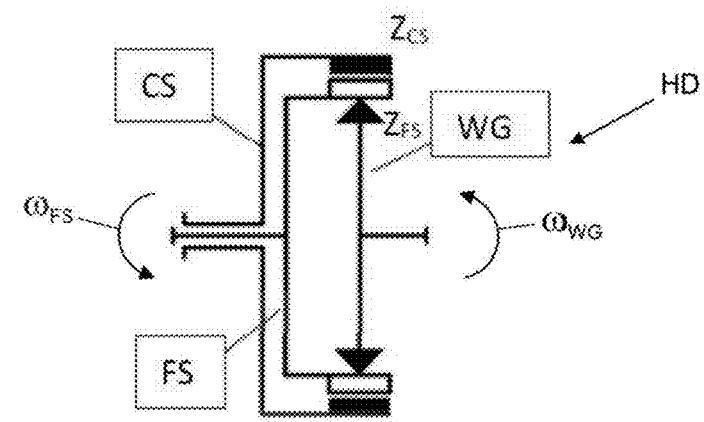
Fig. 10L - PRIOR ART

HARMONIC DRIVE WITH COMPACT STRUCTURE MADE BY PLASTIC MATERIAL

CROSS REFERENCE TO RELATED APPLICATIONS

The present application is the U.S. National Stage of International Application No. PCT/IT2022/050300, filed on Nov. 24, 2022 which, in turn, claims priority to Italian Application No. 102021000030044 filed on Nov. 26, 2021.

TECHNICAL FIELD OF THE INVENTION

The present invention relates in general to the field of speed reducers, that is to say, to those devices, usually comprising a series of gears housed inside a casing or shell and meshed with each other, which reduce a speed of rotation from an input rotary shaft, or drive or fast shaft, to an output rotary shaft, or driven or slow shaft, and more particularly it relates to a new and innovative reducer of the harmonic type which is characterized, as illustrated in detail below, to have its essential components which are made by moulding a plastic material and for a very compact and strong configuration and structure.

BACKGROUND OF THE INVENTION

As it is known in the art, a typical harmonic reducer, also called in English "strain wave gearing" or also "harmonic drive" or "harmonic reducer" or "harmonic reduction gear", invented by C. Walton Musser in 1959, comprises three essential and basic components, i.e.:
- a first toothed element, also called "Circular Spline" and therefore with the acronym CS, in the form of an internally toothed ring;
- a second toothed element, also referred to as "Flex Spline" or "Flexible Spline" and therefore with the acronym FS, flexible and deformable, usually having a cup-shaped or externally toothed bell shape, with a slightly smaller number of teeth, typically two, than that of the internal teeth of the first toothed element CS, and
- a wave generator, also referred to as "Wave Generator", therefore with the acronym WG,
- wherein, in the operation of the harmonic reducer, the wave generator WG, rotating coaxially to the first rigid toothed element CS, cooperates with a thin deformable annular wall of the second toothed element or flex spline FS, so as to deform the respective external toothing from a circular configuration to a slightly elliptical configuration and therefore press it against the internal toothing of the first toothed element or circular spline CS, rigid, and thereby generate a deformation wave also called "strain wave", exhibiting a harmonic trend, which propagates along the toothing of the second toothed element or flex spline FS and causes an advancement of at least two meshing zones between the teeth of the two toothed elements flex spline FS and circular spline CS, wherein this in turn causes a relative rotation of the second flexible toothed element or flex spline FS, with a smaller number of teeth, in the opposite direction with respect to the first rigid toothed element or circular spline CS, at an angular rate considerably reduced with respect to that of the wave generator WG operating as a shaft and input member.

Therefore, the operation of this harmonic reducer is primarily based on the elastic deformation of the flex spline FS in turn induced by the motion and rotation of the wave generator WG, having an elliptical shape profile, which can be constituted by a single element of elliptical shape, or, as in most applications, by a bearing with a series of small rotating balls arranged along the periphery of the wave generator so that their envelope defines the desired elliptical profile.

The special elliptical shape of the wave generator WG is indispensable for the flexible and elastically deformable flex spline FS to engage in the toothing of the rigid circular spline CS, without causing interference but recovering it in the direction orthogonal to the direction along which the meshing occurs.

In most of the applications of these harmonic reducers, the flex spline FS is integral with the element that transmits the motion to the outside, at the reduced angular velocity, and consists of a bell, whose flexibility is determined by its height and thickness.

This geometry and configuration of the flex spline FS, which is typical of the harmonic reducers which are made of harmonic steel, has the advantage of allowing to make teeth of rigid material, but implies a certain encumbrance determined by the bell which is extended in the axial direction.

It is also clear that, in order to achieve an efficient harmonic reducer, i.e. capable of operating correctly over time, the flex spline FS plays a decisive role and on the one hand it must be sufficiently rigid in the area of the toothing so as to ensure correct engagement and transmission of the torque, and on the other hand it must also be sufficiently elastic and flexible so as to make possible the progressive meshing in the circular spline CS, fixed, and at the same time avoid the interference with the teeth thereof in the direction normal to the meshing direction.

Moreover, it is necessary and essential that the deformation of the flex spline FS is always an elastic deformation so as to ensure the maximum efficiency of the harmonic reducer and a good fatigue resistance.

For the sake of clarity, FIG. 10A-FIG. 10K shows in perspective form, separated and assembled, the fundamental parts, previously illustrated, i.e. the circular spline CS, the flex spline FS and the wave generator WG, of a typical harmonic reducer, generally indicated with HD, from the English "Harmonic Drive", according to the prior art, as well as the way in which these fundamental parts cooperate with each other in the operation of the harmonic reducer HD.

Moreover, for a complete information, with reference to the diagram of FIG. 10L, the basic formulas of a typical harmonic reducer are illustrated below, and in particular the formula defining its meshing ratio.

In this schematic diagram of FIG. 10L, the wave generator WG is connected to a servomotor which drives it in rotation around a longitudinal axis of the harmonic reducer, the circular spline CS is fixed, while the flex spline FS is integral with a user or with a member, for example consisting of the arm of a robot, controlled at a reduced rotation by the harmonic reducer.

Therefore, assuming to refer to a reference system integral with the wave generator WG, the following formula applies:

$$\frac{\omega_{CS} - \omega_{WG}}{\omega_{FS} - \omega_{WG}} = \frac{Z_{FS}}{Z_{CS}}$$

with $\omega_{CS}=0$;

where:
$\omega_{CS}$ is the angular velocity of the circular spline CS;
$\omega_{FS}$ is the angular velocity of the flex spline FS;
$\omega_{WS}$ is the angular velocity of the wave generator WG;
$Z_{FS}$ is the number of teeth of the flex spline FS;
$Z_{CS}$ is the number of teeth of the circular spline CS.
Then, by developing this formula, it is obtained:

$$\frac{\omega_{WG}}{\omega_{FS}} = \frac{Z_{FS}}{Z_{FS} - Z_{CS}}$$

from which the following formula of the meshing ratio I of the harmonic reducer HD:

$$I = \frac{\omega_{input}}{\omega_{output}} = \frac{\omega_{WG}}{\omega_{FS}} = \frac{Z_{FS}}{Z_{FS} - Z_{CS}}$$

where:
$\omega_{FS}$ is the angular velocity of the flex spline FS;
$\omega_{input}$ is the angular velocity at the input, i.e. of the wave generator WG, of the harmonic reducer HD;
$\omega_{output}$ is the angular speed at the output, i.e. of the flex spline FS, of the harmonic reducer HD.

It is noted that the meshing ratio I is negative to indicate that the direction of rotation of the wave generator WG, at the input of the harmonic reducer HD, and that of the mobile flex spline FS, at the output of the harmonic reducer HD, are opposite.

At present these harmonic reducers, thanks to their compactness and reduced dimensions, the high transmission ratio, the coaxiality between the input shaft and the output shaft, the clearances reduced to a minimum thanks to the small number of components and parts of which they are composed, other advantageous characteristics and performances, are increasingly widely used in cutting-edge industrial sectors such as robotics, cooperative automation, and the aerospace industry.

For the sake of completeness, some patent documents are mentioned below, found through a research carried out by consulting the specific patent databases and therefore representative of the prior art in this field of harmonic reducers: WO 2021/098903 A1, US 2021/0138667 A1, U.S. Pat. No. 10,883,592 B2, WO 2020/074039 A1, CN 109623819 A, CN 108115658 A, WO 2018/000995 A1, U.S. Pat. Nos. 8,776,638 B2, 6,736,028 B2, US 2003/0089194 A1, EP 1 261 814 B1, U.S. Pat. No. 6,202,509 B1.

These patents indicate that the technology of the harmonic reducers has evolved and has been the subject of continuous developments and improvements over time up to now, starting from when C. Walton Musser had the basic idea and invented the harmonic reducer.

Moreover, from these same patents it can be seen, as already anticipated, that these harmonic reducers are having an increasingly wide and extended application in advanced and cutting-edge industrial sectors such as robotics, where the harmonic reducers can be advantageously used in the joint and joint areas between the arms of the robots, and in that of automation and logistics in general.

However, it can be observed that, at least in general, the harmonic reducers currently offered by the prior art and available in the market involve a considerable manufacturing cost, which appear such as to limit their potential or even exclude their application in certain industrial sectors and fields in which, instead, these harmonic reducers might be advantageously applied if they were more convenient, i.e. if they would imply a lower and more competitive manufacturing cost than the current ones.

Therefore, in the above context, the inventors have perceived that in this special field of harmonic reducers it was possible to go further and to innovate with respect to the prior art, and in particular it was possible to favour and increase the use of these devices in an ever increasing number of industrial applications and sectors, optimizing and reducing their industrial manufacturing cost, and that, for this purpose, the realization of the essential parts of a harmonic reducer could advantageously take benefit from the technology of injection moulding of plastic material.

In particular, in the perception of the inventors, the essential and basic parts, previously described in detail, of a harmonic reducer have and require characteristics, both as regards their configuration and the material with which they are to be made, and, more specifically, the respective deformable toothed element or flex spline, as fundamental part of the harmonic reducer, requires a suitable and appropriate flexibility and elasticity, such that these basic parts can be advantageously manufactured and produced by injection moulding of plastic material, or in general with production technologies connected to the injection moulding of plastic material in which ERGOTECH s.r.l. operates and excels.

SUMMARY OF THE INVENTION

Therefore, a first, more general object of the present invention is to provide a new harmonic reducer which meets the requirements and expectations, as previously illustrated, of the market, currently in relevant and rapid expansion, of these special reducers and devices, in other words a new generation of harmonic reducers having a higher quality and better performances than those currently in use and at the same time suitable for being produced in an industrial and low cost manner.

A second object, connected to the first object of the present invention, is also to provide a new and innovative harmonic reducer whose fundamental parts, i.e. the circular spline, the flexible spline and the wave generator, can be manufactured at a competitive industrial cost and at the same time with a high level of quality, in order to favour and expand its application in many fields, and that for this purpose, in particular for the production of the respective fundamental parts, takes advantage of the technology of injection moulding of plastic material, which technology is successfully applied to produce parts and components in many industrial sectors.

Another object, connected to the preceding ones, of the present invention is also to propose and realize a new harmonic reducer exhibiting a very solid, resistant and compact configuration, as well as such as to imply a limited size, so as to allow an easy and advantageous integration of the harmonic reducer in larger structures.

Yet another object, also connected to the preceding ones, of the present invention is to propose and realize a new harmonic reducer able to be advantageously integrated along motion control and transmission lines, in particular in order to ensure a precise and reliable transmission of motion, for example, in the joint and joint areas of the arms of a robotic apparatus or the like.

The above objects can be considered fully achieved by the harmonic reducer having the characteristics defined by the first independent main claim.

Particular embodiments of the harmonic reducer of the invention are further defined by the dependent claims.

Advantages of the Invention

The new harmonic reducer of the invention, thanks to its special and unique characteristics and as will be apparent from the following description, offers numerous and important advantages, partly already implicitly announced, among which the following ones, cited for illustrative purposes only:
- a solid, resistant and compact structure;
- a competitive production cost, without this advantageous cost being at the expense of the quality of the harmonic reducer produced;
- capability to operate with very high transmission ratios, not dissimilar to those of the known harmonic reducers currently available on the market;
- possibility of integrating the harmonic reducer in and along motion control and transmission lines requiring very precise and reliable commands and movements;
- possibility of producing the harmonic reducer in an industrial manner with limited and optimized costs;
- an easy and rapid assembly of the parts of which the harmonic reducer is constituted;
- an easy integration in larger and more complex structures and machines, in various industrial sectors and in particular in the field of robotics;
- absence of clearance between the parts and the components of which the harmonic reducer is constituted, so as to transmit the motion in an extremely precise manner;
- reliable operation and limited wear over time;
- reduced, if not zero, maintenance costs.

BRIEF DESCRIPTION OF THE DRAWINGS

These and other objects, features and advantages of the present invention will become apparent from the following description of a preferred embodiment thereof, given purely by way of a non-limiting example with reference to the attached drawings, in which:

FIG. 10A-FIG. 10K are graphic images showing the basic parts, the configuration and the operation of a typical harmonic reducer according to the prior art;

FIG. 10L is a diagram, integrating the graphic images of FIG. 10A-FIG. 10K, illustrating the configuration of a typical harmonic reducer according to the prior art;

DETAILED DESCRIPTION OF A PREFERRED EMBODIMENT OF THE HARMONIC REDUCER OF THE INVENTION

Figure 1:
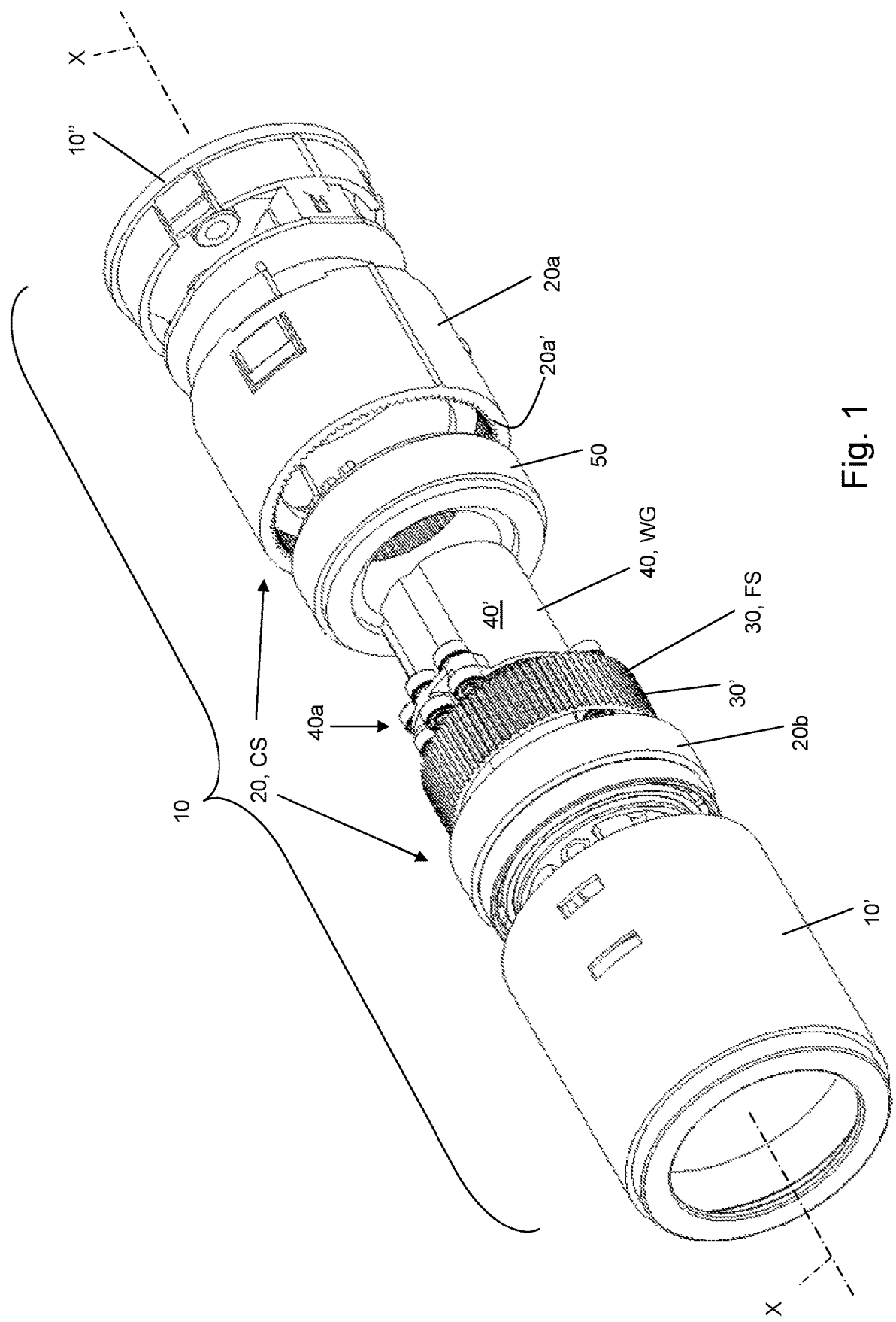
FIG. 1 is an exploded axonometric view of a harmonic reducer according to the present invention.
Figure 2A:
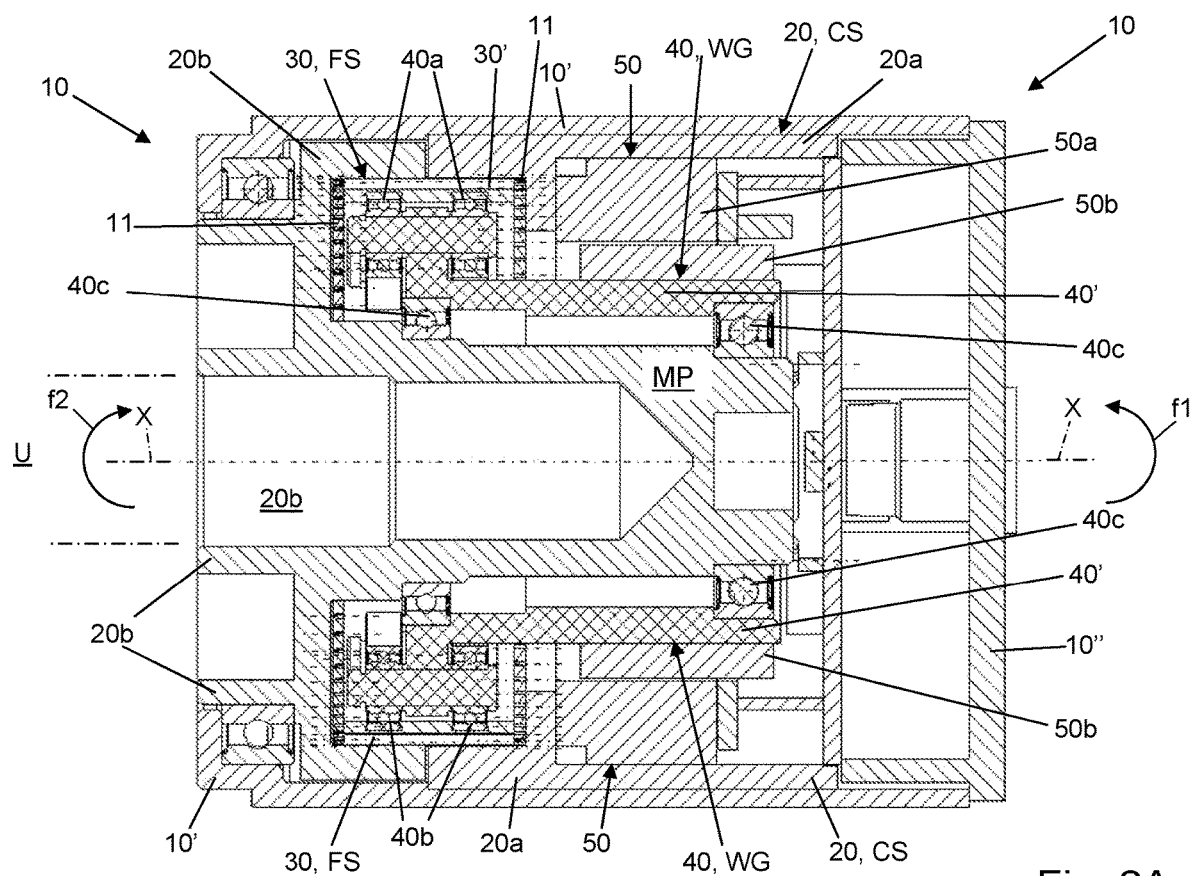
FIG. 2A is a first schematic longitudinal sectional view of the harmonic reducer of FIG. 1 according to the present invention.
Figure 2B:
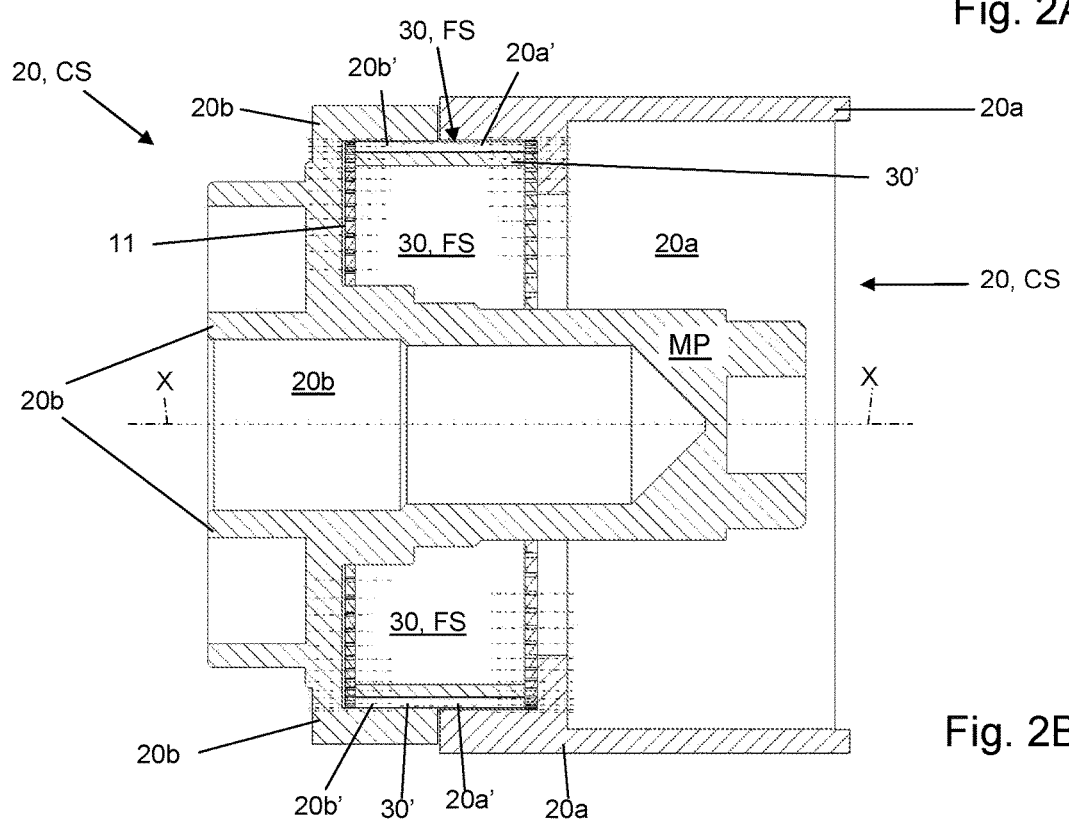
FIG. 2B is a second schematic longitudinal sectional view of the fundamental components of the harmonic reducer of FIG. 1 and in particular of a respective circular spline, in turn divided into a fixed circular spline and a movable circular spline, internally toothed, and of a respective flex spline, externally toothed.
Figure 3:
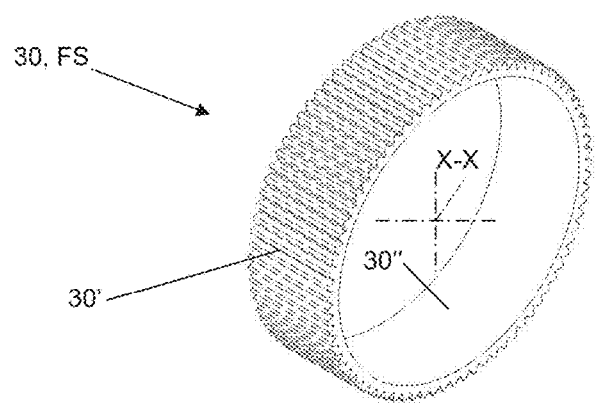
FIG. 3 is a three-dimensional graphical image of the flex spline of FIG. 2B.
Figure 4:
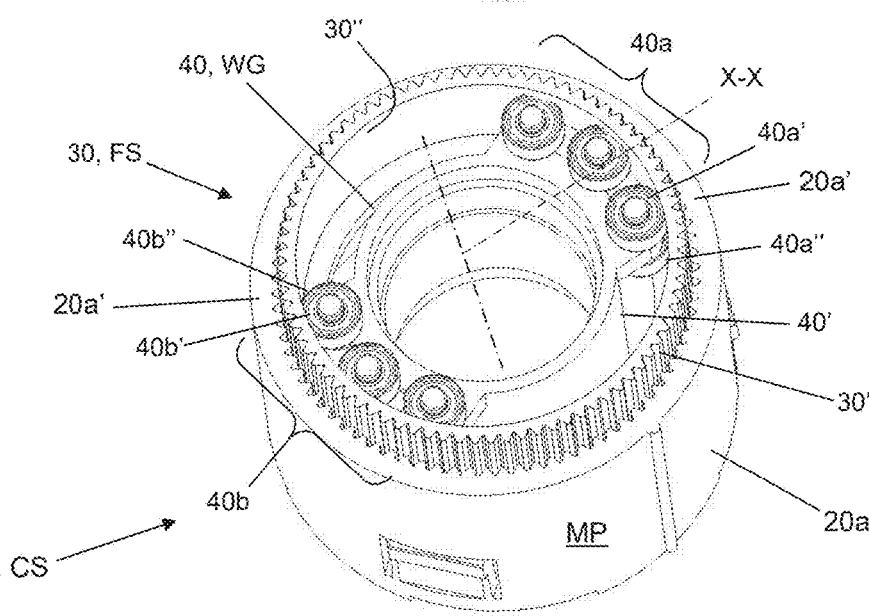
FIG. 4 is a three-dimensional graphical image of a group consisting of the fixed circular spline and the flex spline of FIGS. 2B and 3, and by a wave generator included in the harmonic reducer of FIG. 1.
Figure 5:
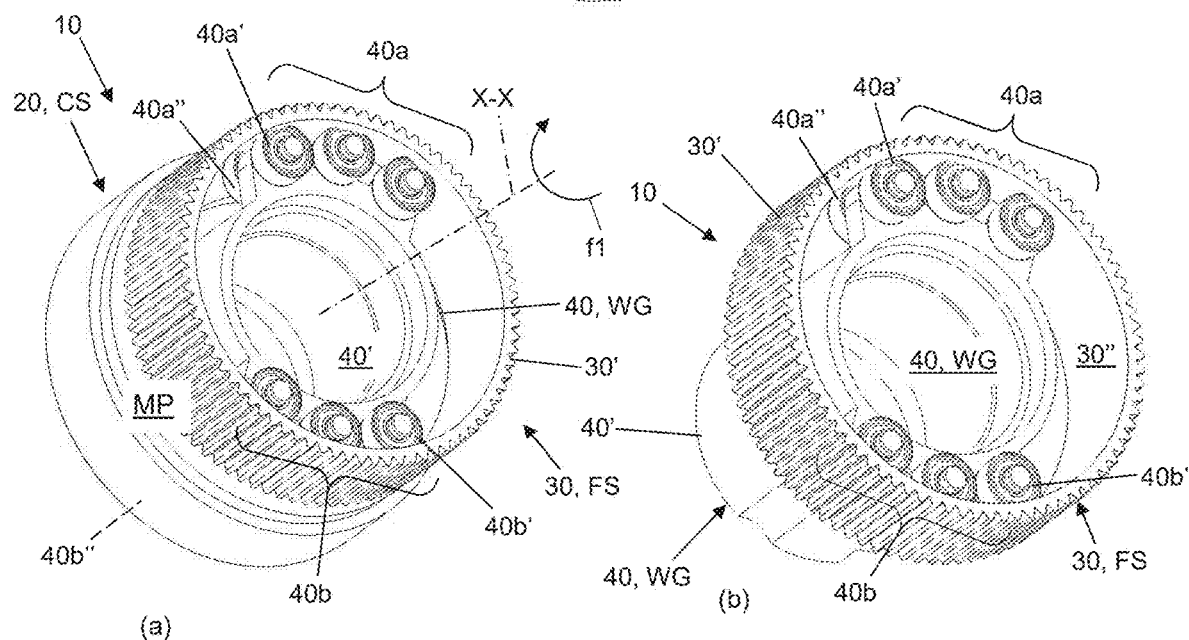
FIG. 5, divided into sections (a) and (b), consists of two three-dimensional graphical images showing from two different observation points a group consisting of the flex spline and the wave generator of FIG. 4.
Figure 6:
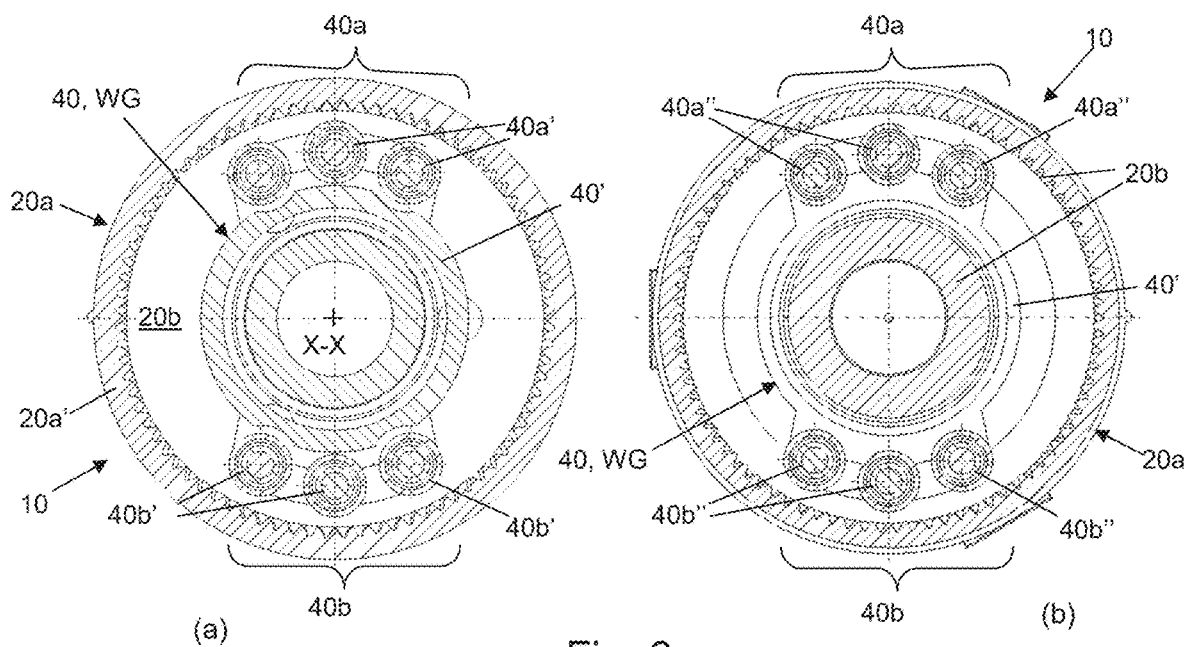
FIG. 6, divided into sections (a) and (b), consists of two cross-sectional views of the harmonic reducer of the invention showing the shifting between the internal teeth of the respective fixed circular spline and of the respective movable circular spline.

With reference to the drawings and in particular to the respective FIGS. 1, 2A and 2B a harmonic reducer, or harmonic drive, made according to the present invention is indicated as a whole and generally with 10 and comprises:
- an outer shell 10', fixed; and
- three fundamental components or parts, housed in the outer shell 10', consisting respectively of:
  - a first part or circular spline, indicated with 20 or CS (from Circular Spline), rigid, having a respective internal toothing;
  - a second part or flex spline, indicated with 30 or FS (from Flexible Spline), flexible and elastically deformable, externally toothed, able to transmit the motion in the harmonic reducer 10; and
  - a third part or wave generator, indicated by 40 or WG (from Wave Generator); and
- an electric motor, designated by the reference numeral 50 and also housed in the fixed outer shell 10', adapted to control the rotation of the wave generator 40 about a longitudinal axis X-X of the harmonic reducer 10, as indicated by an arrow f1 in FIG. 2A.

The electric motor 50 has a stator 50a integral with the outer shell 10', fixed, and a rotor 50b, integral with a central support body, indicated with 40', of the third part or wave generator 40, WG, to control it in rotation about the axis X-X of the harmonic reducer 10.

Moreover, a cover 10" has the function of closing the outer shell 10' of the harmonic reducer 10, with all the respective parts and components 20, 30, 40 and 50, listed above, housed inside the same outer shell 10'.

According to a salient feature of the present invention, the reducer 10 has an innovative configuration, in which the first part or circular spline 20 is a double circular spline and in particular consists of a first fixed circular spline, indicated in the drawings by 20a, integral with the outer shell 10' of the harmonic reducer 10, and of a second movable or mobile circular spline, indicated with 20b, integral with a user U, of the harmonic reducer 10, schematized with dash and dot lines in FIG. 2A, with each of these first and second circular splines 20a, 20b having a respective internal toothing 20a', 20b'.

The internal toothing 20a' of the first fixed circular spline 20a, integral with the external shell 10', has a number of teeth equal to that of the external toothing 30' of the flex spline 30, while the internal toothing 20b' of the second mobile circular spline 20b, integral with the user U, has some more teeth, in particular two, than those of the internal toothing 20' of the first fixed circular spline 20a.

Also the flex spline 30 has an innovative externally toothed belt configuration with a smooth inner surface, indicated by 30", and with an outer toothing 30' which is meshed half with the inner toothing 20a' of the first fixed circular spline 20a and another half with the inner toothing 20b' of the second movable circular spline 20b.

The wave generator 40 in turn has a first group, indicated with 40a, of bearings, each rotating about its own axis, supported by the central support body 40', and a second group, indicated 40b, of bearings, which also rotate about their axes and are supported by a central supporting body 40', wherein these two groups 40a and 40b of rotatable bearings are arranged in diametrically opposite regions of the wave generator 40 and engage and are adapted to cooperate with the inner surface 30" of the flex spline 30, to elastically deform it and press a first half of its outer toothing 30' against the inner toothing 20a' of the fixed circular spline 20a and a second half of its outer toothing 30' against the inner toothing 20b' of the movable circular spline 20b, when, in the operation of the harmonic reducer 10, as described later, the wave generator 40 rotates, as indicated by the arrow f1, about the longitudinal axis X-X of the harmonic reducer 10.

For this purpose, both the group 40a and the group 40b of rotating bearings, exhibited by the wave generator 40, are each divided into two sub-groups, wherein each of these two sub-groups is in turn constituted by a plurality of rotating bearings or rollers, arranged in a row.

In particular, the group 40a of rotating bearings is divided into two sub-groups consisting of two corresponding rows, arranged side by side, of rotating bearings or rollers, each row in turn consisting, for example, of three rotating rollers, respectively 40a' and 40a", wherein these two adjacent rows of rotating rollers 40a' and 40a" engage the flex spline 30 to respectively press a first half of its surface 30' against the internal toothing 20a' of the fixed circular spline 20a and a second half of its external toothing 30' against the internal toothing 20b' of the mobile circular spline 20b.

Similarly, the group 40b of rotating bearings is divided into two sub-groups consisting of two corresponding rows, arranged side by side, of rotating bearings or rollers, each row in turn consisting, for example, of three rotating rollers, respectively 40b' and 40b", wherein these two adjacent rows of rotating rollers 40b' and 40b" engage the flex spline 30 to respectively press a first half of its surface 30' against the internal toothing 20a' of the fixed circular spline 20a and a second half of its external toothing 30' against the internal toothing 20b' of the 20b mobile circular spline.

Advantageously, as also clearly shown in the drawings, the various rotating bearings 40a', 40a", 40b', 40b", included in the wave generator 40 and able to cooperate in contact with the inner surface 30" of the flex spline 30, are constituted by ball bearings or similar components, in such a way as to minimize friction during their rotation about their own axes.

Still, in order to reduce as much as possible friction, in this innovative configuration of the harmonic reducer 10, as described above, the central support body 40' of the wave generator 40 of the harmonic reducer 10 is rotatably mounted on the second movable circular spline 20b with the interposition of one or more ball bearings or similar components, indicated with 40c.

As also clearly shown in the drawings, in this innovative configuration of the harmonic reducer 10, the flex spline 30 is housed in an annular compartment, indicated with 11 in FIGS. 2A and 2B, formed by the first fixed circular spline 20a, the second mobile circular spline 20b, and the wave generator 40.

For completeness, in addition to the description of the configuration of the harmonic reducer 10 of the invention, the following table shows a series of possible combinations, which can be realized and implemented in this harmonic reducer 10, of the number of teeth $Z_{CS}$ of the mobile circular spline 20b and of the number of teeth $Z_{FS}$ of the flex spline 30, in turn equal to the number of teeth of the fixed circular spline 20a.

The same table also shows the meshing ratio I of the harmonic reducer 10, calculated with the above mentioned formula, corresponding to such possible combinations.

| Number of teeth $Z_{CS}$ of the mobile circular spline 20b | Number of teeth $Z_{FS}$ of the flex spline 30 and of the fixed circular spline 20a | Meshing ratio I of the harmonic reducer 10 |
|---|---|---|
| 70 | 68 | −34 |
| 71 | 69 | −34.5 |
| 72 | 70 | −35 |
| 73 | 71 | −35.5 |
| 74 | 72 | −36 |
| 75 | 73 | −36.5 |
| 76 | 74 | −37 |
| 77 | 75 | −37.5 |
| 78 | 76 | −38 |
| 79 | 77 | −38.5 |
| 80 | 78 | −39 |
| 81 | 79 | −39.5 |
| 82 | 80 | −40 |
| 83 | 81 | −40.5 |
| 84 | 82 | −41 |
| 85 | 83 | −41.5 |
| 86 | 84 | −42 |
| 87 | 85 | −42.5 |
| 88 | 86 | −43 |
| 89 | 87 | −43.5 |

Figure 7:
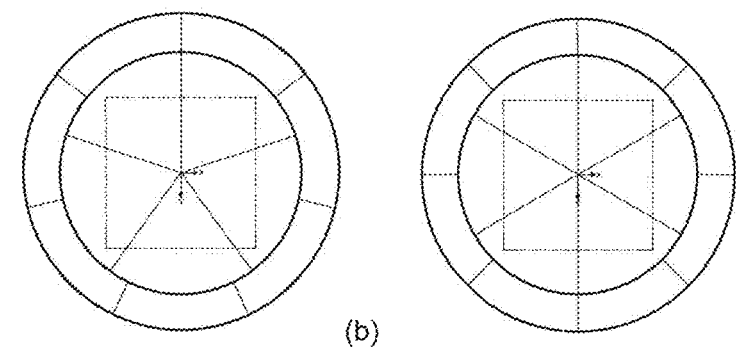
FIG. 7, divided into sections (a) and (b), is a diagram illustrating how the number of teeth of the toothing of the flex spline and of the movable circular spline of the harmonic reducer of the invention can be selected.

FIG. 7 in turn is a diagram which, in addition to the previous table, illustrates, at the respective left section (a), how it can be chosen the number of teeth, in the case of an odd number, and, at the respective right section (b), how it can be chosen the number of teeth, in the case of an even number, of the toothing of the flex spline 30, and therefore also of the fixed circular spline 20a, and of the toothing of the mobile circular spline 20b, which are included in the harmonic reducer 10 of the invention.

In particular, this FIG. 7 of the drawings allows to appreciate an important characteristic of the configuration of the harmonic reducer 10 of the invention which is at the base of its operation, described in greater detail hereinafter.

In fact, as can be deduced from this FIG. 7, imposing a difference of two teeth between the teeth of the fixed circular spline 20a and those of the mobile circular spline 20b and adopting for them an even number of teeth, there are always two diametrically opposed positions and zones in which there is a perfect alignment between the two circular splines fixed 20a and movable 20b and in which it is therefore possible to correctly mesh the flex spline 30 with such zones.

In this way it is also possible to define the number of lobes of the wave generator 40, i.e. of the respective groups of rotatable bearings which engage and press on the inner surface 30" of the flex spline 30, so as to engage and mesh with the circular spline 20, with this number that must be equal to two.

According to a further salient feature of the present invention, the first and second parts of the harmonic reducer 10, i.e. the circular spline 20, the flex spline 30, and the central supporting body 40' of the third part, i.e. of the wave generator 40, are totally realized by moulding, preferably of the injection type, of a plastic material, generally indicated by MP.

In particular, the materials or plastic materials MP usable within the scope of the present invention to make these parts and components of the harmonic reducer 10 can be grouped into two macro-types, i.e. rigid and flexible plastic materials.

More specifically, the flex spline part or component 30 needs to be flexible and elastically deformable, but at the same time resistant.

Therefore this flex spline component 30 is preferably made by injection moulding of a plastic material or a high molecular weight polymer without addition of fibers or reinforcing fillers, with a possible addition in the polymer of tribological additives, or additives and substances suitable to reduce the friction and wear of the surfaces of the flex spline 30 in contact with and in relative motion with the other parts of the harmonic reducer 10.

Among these additives there are mentioned, for example, PTFE (from PolyTetraFluoroEthylene), also known under the trade name Teflon, silicon Si, and molybdenum disulfide $MoS_2$, and other additives suitable to give the flex spline 30 the required tribological characteristics.

The circular spline part or component 20, in turn consisting of the fixed part 20a and the movable or mobile part 20b, needs instead to be rigid, so that in this case the polymers and plastic materials usable for the injection moulding of the two fixed and movable parts 20a and 20b, of the circular spline 20, can contain fibers and reinforcements of any kind and type, suitable to give these two parts the required mechanical, thermal and dimensional strength.

In general, the choice of plastic materials which can be used to mould the circular spline 20 and the flex spline 30 is very wide, and in this choice many factors can have an influence, as well as both thermoset plastic materials and thermoplastic materials and their composite and additive variants can be considered.

In the context of the invention, suitably additived plastic materials can also be advantageously used to produce tribological bushings by injection moulding, or having antifriction properties, suitable to replace the rotating ball bearings 40a', 40a", 40b', 40b", included in the wave generator 40, which engage the inner surface 30" of the flex spline 30.

In order to provide a more precise information on this relevant aspect of the invention, a list of specific plastic materials MP is given below, by which the three basic parts of the harmonic reducer 10, i.e. the circular spline 20, the flex spline 30, and the wave generator 40, can be produced by injection moulding:
  amorphous or semicrystalline thermoplastic polymers,
  thermosetting polymers, thermoplastic or composite thermoset polymers or charged with inert or functional fillers and/or reinforced with fibers of various kinds glass, carbon, kevlar, natural fibers;
  thermoplastic or thermosetting composite polymers charged with metal powders, ceramics, mica, talc, various types of inert fillers.

Among the materials which can be used to make the parts of the harmonic reducer 10, terpolymers and composite nano-polymers are also mentioned.

Moreover, in general, all those plastic materials which are functionalized with additives of all kinds and types, or those polymeric materials which may contain other substances aimed at improving their properties, can be used.

Operation of the Harmonic Reducer of the Invention

In the operation of the harmonic reducer 10 of the invention, the rotor of the electric motor 50, mounted directly on the central support body 40' of the wave generator 40, commands and controls a rotation of the latter about the longitudinal axis X-X of the harmonic reducer 10, as indicated in the drawings by an arrow f1.

Therefore, since the two circular splines, i.e. the fixed circular spline 20a and the movable circular spline 20b of the harmonic reducer 10 are angularly offset from each other due to the difference of two teeth between the respective internal toothings, the rotation of the wave generator 40 about the longitudinal axis X-X, in turn driven by the motor 50, causes this angular offset and shift to be continuously recovered by the flexible, toothed belt-shaped, flex spline 30, that under the thrust and pressure applied on its inner surface 30" by the rotating bearings 40a and 40b of the wave generator 40 engages and meshes with the fixed circular spline 20a, so as to be subjected to a certain elastic deformation such as to align the teeth of the movable circular spline 20b with those of the fixed circular spline 20a at the two diametrically opposite meshing regions of the flex spline 30 with the two circular splines fixed 20a and mobile 20b.

In this way, the movable circular spline 20b of the harmonic reducer 10 is subject to rotate, as indicated by an arrow f2, about the longitudinal axis X-X, in the opposite direction and at a considerably reduced angular speed, as determined by the meshing ratio I of the harmonic reducer 10 itself, with respect to the rotation, corresponding to the arrow f1, at which the electric motor 50 controls the wave generator 40.

A Numerical Example of a Possible Embodiment of the Harmonic Reducer of the Invention For a more complete information, a purely indicative and non-limiting example of an embodiment, integrated with numerical data, of the harmonic reducer 10 of the invention will be described below.

In particular, in this example, the harmonic reducer 10 has the following characteristics:
  number of teeth of the fixed circular spline 20a=80
  umber of teeth $Z_{CS}$ of the mobile circular spline 20b=82
  number of teeth ZFS of the flex spline 30=80
  whereby it is obtained from the following formula, already mentioned above:

$$I = \frac{Z_{FS}}{Z_{FS} - Z_{CS}} = \frac{80}{80 - 82} = -40$$

a meshing ratio I=−40 of the harmonic reducer 10
electric motor 40, integrated in the harmonic reducer 10, with:
nominal torque=0.3 Nm
nominal speed=5.000 RPM (Revolutions Per Minute)
from which it is obtained:
power in Watt delivered by the harmonic reducer 10=0.3*5000*(2π/60)=157 W
peak torque=0.96 Nm
Therefore, in the case of operation of the harmonic reducer 10 in the nominal condition, it is obtained:
torque $C_u$ at the output of the harmonic reducer=0.3*40=12 Nm
angular velocity $\omega_u$ at the output of the harmonic reducer= (157 W/12 Nm)=13 rad/sec=13*(60/2π)=124 RPM
Instead, In the case of operation of the harmonic reducer 10 in peak torque condition, the following is obtained:
torque $C_u$ at the output of the harmonic reducer=0.96*40=38.4 Nm
angular velocity $\omega_u$ at the output of the harmonic reducer= (157 W/38.4 Nm)=4 rad/sec=4*(60/2π)=38 RPM Dimensions of the Harmonic Reducer of the Invention Still, again for reasons of completeness of information, some dimensional data, also purely indicative, will be provided on the fundamental components, previously illustrated, of the harmonic reducer 10.

The axial dimension of the harmonic reducer 10 is primarily and substantially determined by the following two main factors: the axial extension of the electric motor 40 to be used and the band width of the flex spline 30, in the form of a toothed belt, which in turn is a function of and depend on the torque to be transmitted with the harmonic reducer 10.

As can be seen from the drawings, the harmonic reducer 10 of the invention, thanks to the special toothed belt configuration of the respective flex spline 30, advantageously has a considerably reduced overall size and axial extension with respect to the harmonic reducers currently available on the market, whose flex splines usually have a conventional bell-shaped configuration or the like.

It is also clear that this special belt configuration, externally toothed, which characterizes the flex spline 30 included in the harmonic reducer 10 of the invention, requires the use of a suitable plastic material, among those mentioned above, to make this flex spline 30, in such a way that it is capable of ensuring the performances required for it, and in particular a high mechanical resistance to both torsional and flexural stresses, as well as a good elasticity and the capability to maintain such elasticity unchanged over time.

In fact, unlike conventional harmonic reducers with flex splines exhibiting a bell-shaped configuration in which the respective teeth have to support only the stresses in the direction normal to their face during the transmission of motion and torque, in the case of the harmonic reducer 10 of the invention the teeth of the respective flex spline 30, exhibiting an externally toothed belt configuration, are also subjected to torsion, as confirmed by the simulations described later carried out during the design phase of the harmonic reducer 10, at the center line of the belt band width, due to the alignment between the teeth of the two fixed and mobile circular splines, respectively 20a and 20b.

Figure 8:
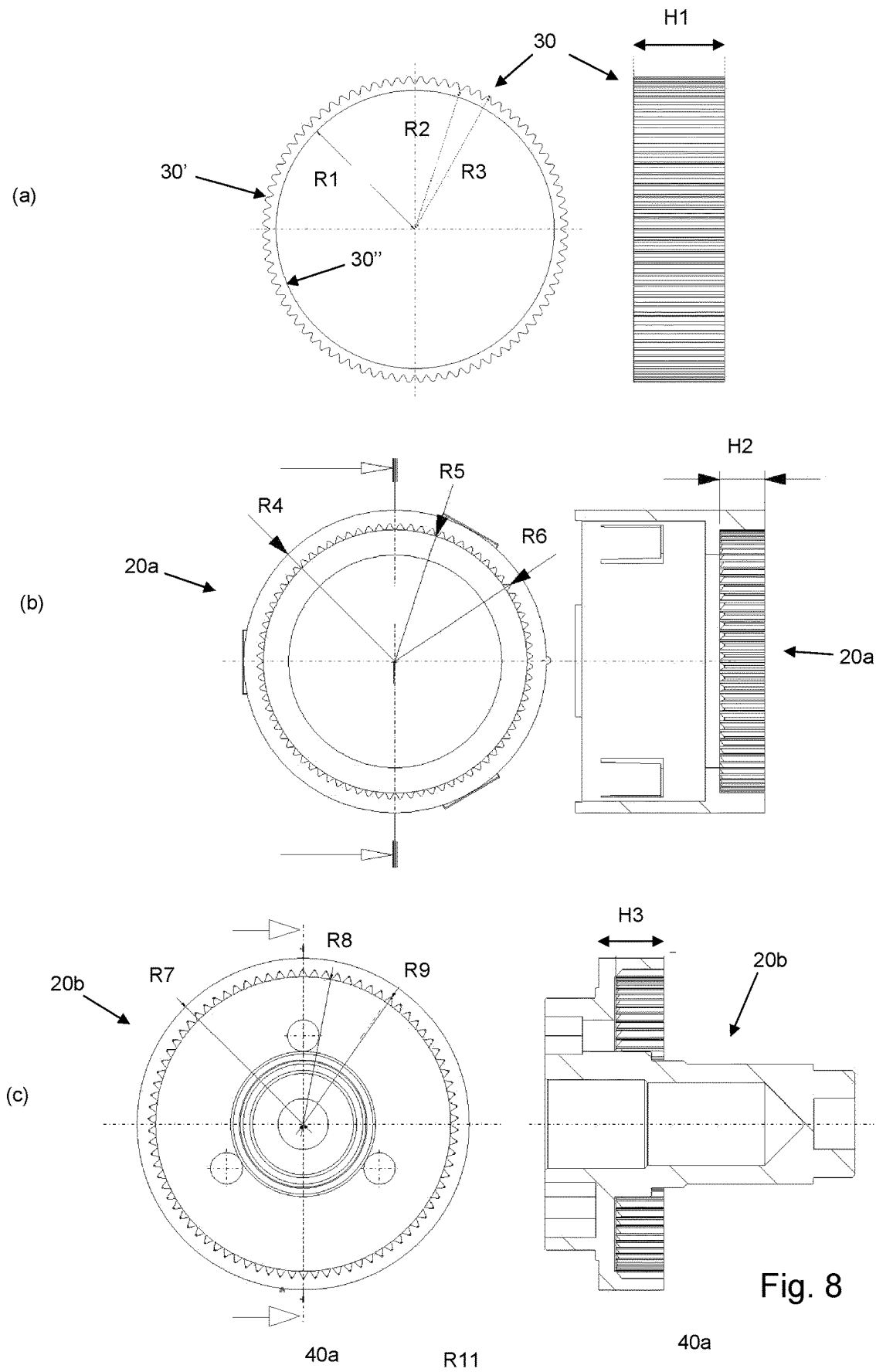
FIG. 8, divided into sections (a)-(f), shows some constructional drawings and the salient dimensions of the fundamental components of the harmonic reducer of the invention.

Moreover, again in order to provide an even more complete and precise information, FIG. 8 of the drawings, divided into sections (a)-(f), shows some construction drawings, in normal view and in section, concerning the fundamental components, previously illustrated, of the harmonic reducer 10 of the invention, and, with reference to the following table, by way of non-limiting example, some possible dimensional values of these components.

| Component | Preferred dimensions [mm] |
| --- | --- |
| Flex spline 30 | R1 = 21.4; R2 = 22.4; R3 = 23.5; H1 = 14 |
| Fixed circular spline 20° | R4 = 27; R5 = 23.5; R6 = 24.5; H2 = 8 |
| Mobile circular spline 20b | R7 = 26.3; R8 = 23.4; R9 = 24.6; H3 = 7.5 |
| Wave generator 40 | R10 = 15; R11 = 3.5; H4 = 30.9; H6 = 44.4; H7 = 38; α = 27° |
| Outer shell 10' | R12 = 28.5; H5 = 66.6 |

In particular, FIG. 8—section (f) shows the arrangement of the two groups 40a and 40b of rotating bearings, arranged in diametrically opposite areas in the wave generator 40, which cooperate with the inner surface 30″ of the flex spline 30 to deform the latter and press it against the circular spline 20.

Design, Simulation and Experimentation of the Harmonic Reducer of the Invention

The harmonic reducer of the invention has been the object of an accurate design, supported by structural simulations, and of a subsequent experimentation, carried out on some prototypes, which have confirmed its innovative characteristics and relevant advantages.

Figure 9:
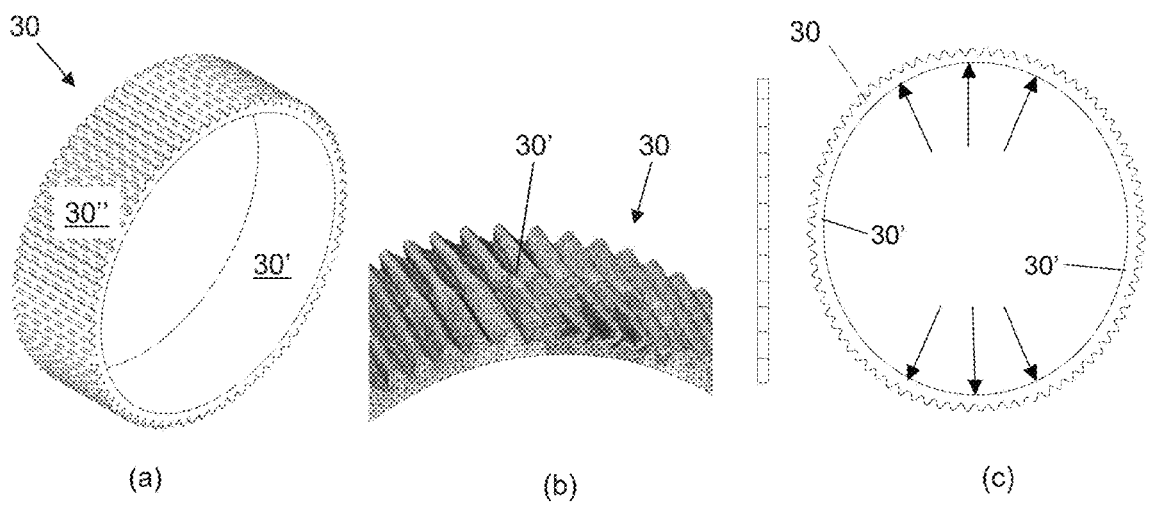
FIG. 9, divided into sections (a)-(c), shows the simulations of some parts, such as for example the elastically deformable flex spline of the harmonic reducer of the invention, which have been carried out during its design.

In particular, FIG. 9, divided into sections (a)-(c), is a simulation of the stresses and corresponding deformations to which the flex spline 30 is subjected due to the thrust, symbolized by arrows, applied by the rotating rollers 40a and 40b on the inner surface 30″ of the same flex spline 30 during the operation of the harmonic reducer 10 and therefore the rotation of the wave generator 40 about the longitudinal axis X-X.

As can be seen from this FIG. 9, the simulation shows that, during the operation of the harmonic reducer 10, in order to align the teeth of the fixed circular spline 20a and of the movable circular spline 20b, the flex spline 30, exhibiting a belt configuration with an external toothing, is subjected in combination both to stresses and torsional deformations in the center-line region of the toothed belt band and to stresses and deflections of its teeth.

Figure 11A:
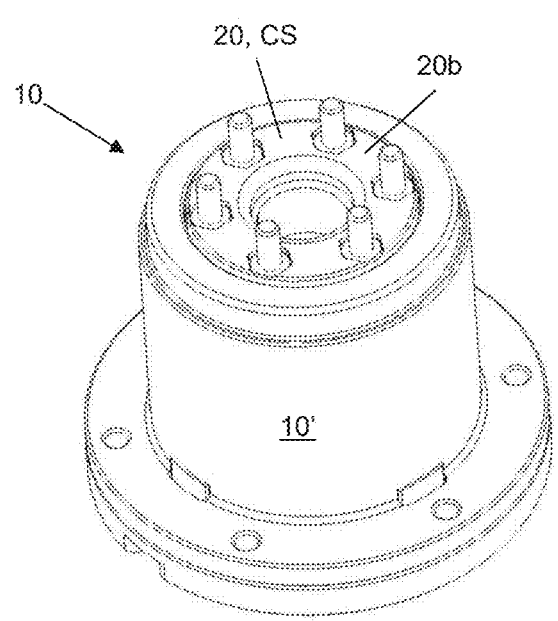
FIG. 11A shows a graphical image of a prototype of the harmonic reducer of the invention and FIG. 11B shows a photograph of a prototype of the harmonic reducer of the invention.
Figure 11B:
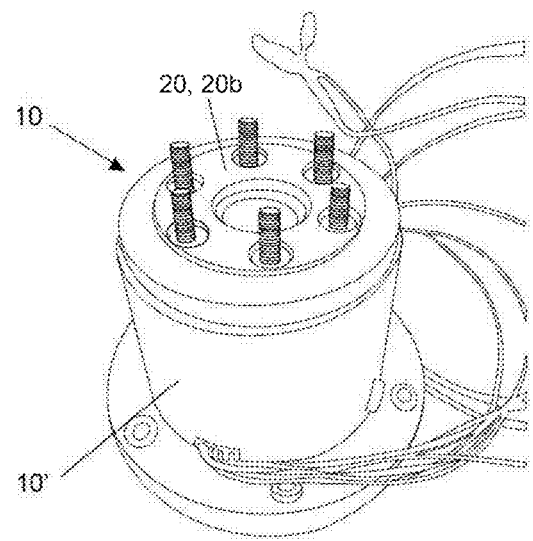

For completeness, FIG. 11A shows a perspective graphic image and FIG. 11B shows a photograph of a prototype, effectively made and tested in this experimental phase, of the harmonic reducer 10 of the invention.

Variants

Of course, without prejudice to the principle and basic concepts of the present invention, the embodiments and details of the harmonic reducer, proposed herein, in particular characterized, but not only, in that its essential parts are substantially produced by injection moulding of a plastic material MP, can be widely varied with respect to what has been described and illustrated heretofore, without departing from the scope of the same invention.

For example, the wave generator 40, in order to cooperate with and deform the flex spline 30, instead of a first double row or first group 40a of rotatable bearings and of a second double row or second group 40b of rotatable bearings, arranged in diametrically opposite regions of the wave generator 40, as in the embodiment 10 described above of the harmonic reducer, it can simply comprise a first bearing and a second bearing, always arranged in diametrically opposite regions of the wave generator 40, wherein each of these first and second bearings is adapted to cooperate into contact with the inner surface 30″ of the flex spline 30 to press a first and a second half of the outer toothing 30′ of the same flex spline 30 respectively against the inner toothing 20a' of the first circular fixed spline 20a and against the inner toothing 20b' of the second movable circular spline 20b of the circular spline 20.

Figure 12A:
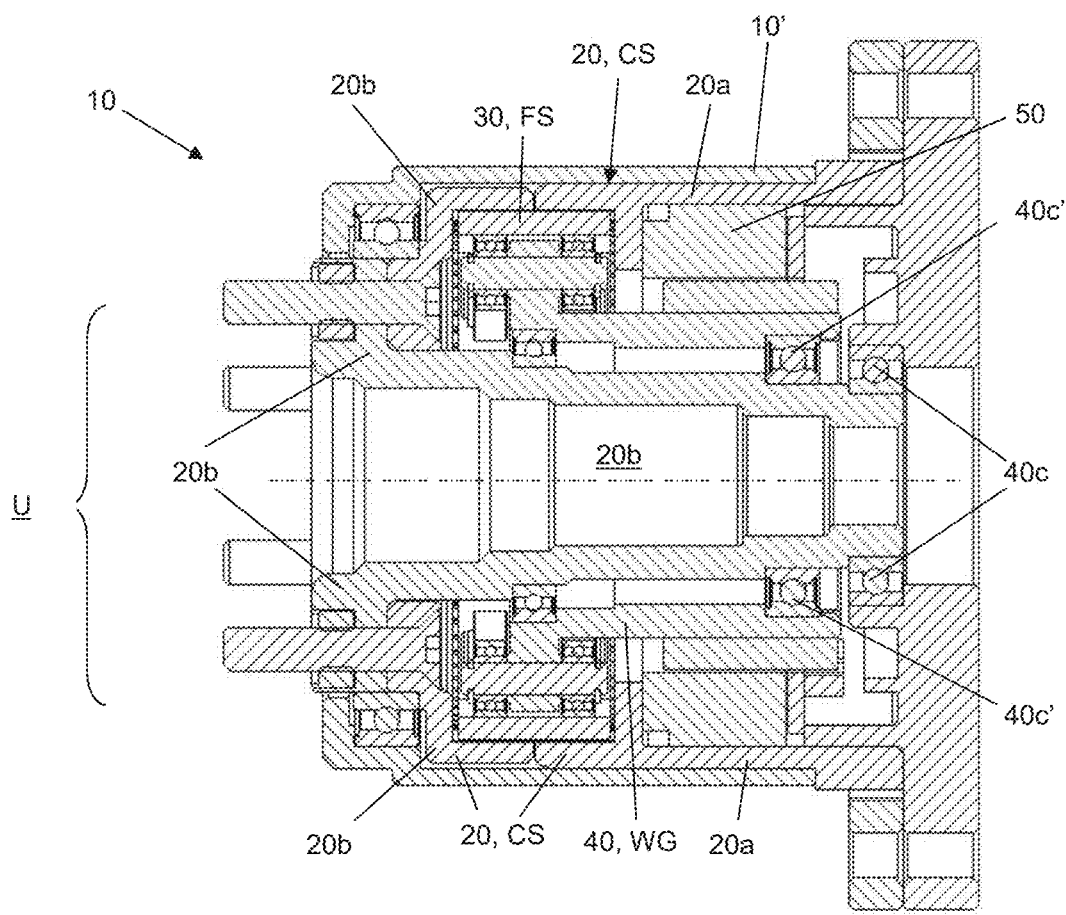
FIG. 12A and FIG. 12B consists of two graphic views which show in longitudinal section a variant of the harmonic reducer of the invention; and FIG. 12C
Figure 12B:
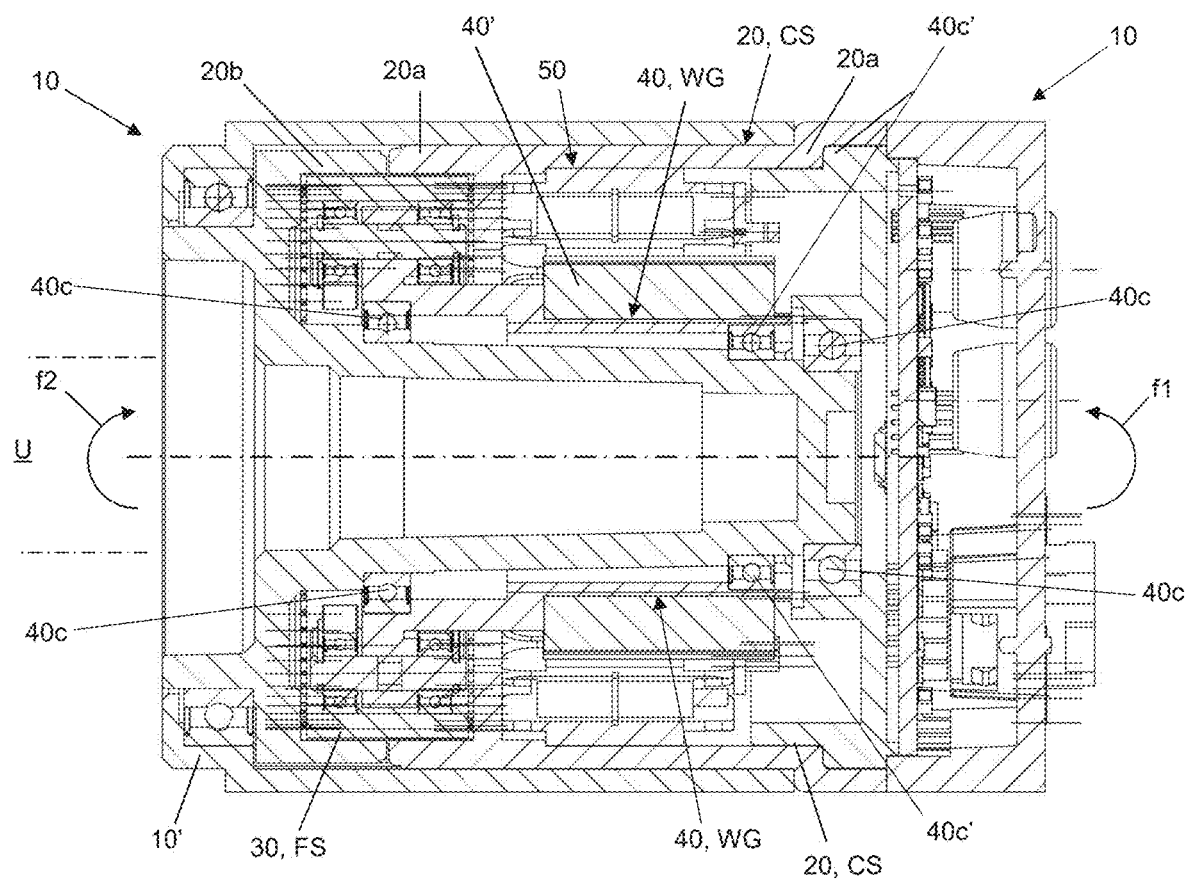

Again, according to a variant shown in FIG. 12A and FIG. 12B, the harmonic reducer 10 of the invention can comprise a bearing, indicated with 40c', additional to the bearings 40c, able to allow a tighter coaxiality tolerance between the various parts that make up this harmonic reducer 10.

Figures 12C, 12D, 12E:
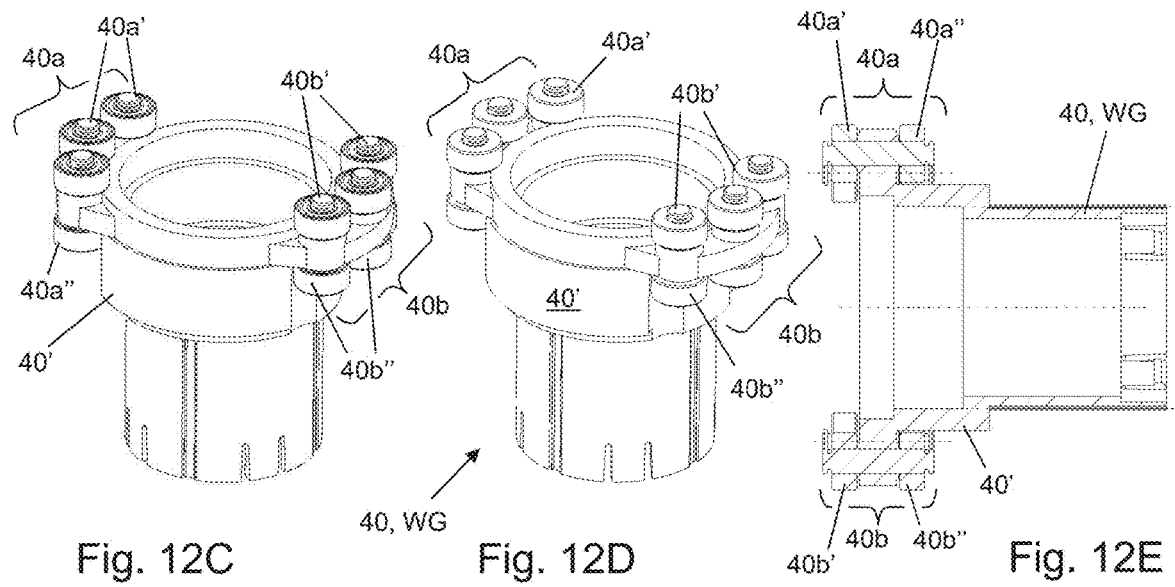
-FIG. 12E is a series of graphic images showing in perspective form and in section some variants of parts of the harmonic reducer of the invention.

Furthermore, as previously illustrated and represented in FIG. 12C-FIG. 12E, the bearings 40a'-40a" and 40b'-40b", as shown in this FIG. 12C, which are respectively included in the two groups 40a and 40b and are rotatably supported by the central support body 40' of the wave generator 40, can be replaced by bushings of metal or polymeric material, as shown in perspective form and in section in FIG. 12D and FIG. 12E.

It is also implicit that the harmonic reducer 10 of the invention is foreseen to be governed by a dedicated program or software having in particular the function of controlling the motor 50, both as regards its rotation speed and the respective intervention times, taking into account the specific application in which this 10 harmonic reducer is applied.

The invention claimed is:

1. A motorized harmonic drive comprising:
an outer shell;
a circular spline, rigid, internally toothed;
a flex spline, flexible and elastically deformable, in the form of a belt, externally toothed, meshed and configured to cooperate with said circular spline to transmit motion in the motorized harmonic drive;
a wave generator configured to rotate around a longitudinal axis of the motorized harmonic drive; and
an electric motor, for driving rotation of said wave generator around the longitudinal axis of the motorized harmonic drive,
wherein the circular spline, the flex spline, and the wave generator are housed in the outer shell;
wherein the wave generator is configured to engage directly, in diametrically opposite areas of the wave generator, an internal surface of the flex spline to elastically deform the flex spline and press an external toothing of the flex spline against an internal toothing of the circular spline, when the wave generator rotates around the longitudinal axis of the motorized harmonic drive;
wherein said circular spline is a double circular spline and comprises a first circular spline fixed to the outer shell and a second circular spline configured to be connected to an external entity, and each of said first circular spline and said second circular spline having a respective internal toothing;
wherein said second circular spline is configured to rotate around said longitudinal axis at a reduced angular speed with respect to the rotation, controlled by said electric motor, of said wave generator;
wherein the internal toothing of the first circular spline, fixed to the outer shell, has a number of teeth equal to that of the external toothing of the flex spline, and the internal toothing of the second circular spline, configured to be connected to the external entity, has a number of teeth that is two greater than the number of teeth of the internal toothing of the first circular spline;
wherein the external toothing of the flex spline is meshed half with the internal toothing of the first circular spline and half with the internal toothing of the second circular spline;
wherein the wave generator comprises at least a first rotating bearing and at least a second rotating bearing arranged in diametrically opposite areas of the wave generator, the first rotating and second rotating bearings, when the wave generator rotates around the longitudinal axis of the motorized harmonic drive, engage an internal surface of the flex spline to elastically deform the flex spline and press a first half of the external toothing of the flex spline against the internal toothing of the first circular spline and press a second half of the external toothing of the flex spline against the internal toothing of the second circular spline;
whereby, in the operation of the motorized harmonic drive, when the wave generator rotates around said longitudinal axis, an angular phase shift between the first and the second circular splines of the circular spline, due to the difference between the number of the teeth of the two internal toothings of the first circular spline and of the second circular spline, causes an elastic deformation of the flex spline, engaging with the first circular spline under the pressure exerted by the wave generator on the internal surface of the flex spline, and forces the second circular spline to align with the first circular spline in at least two meshing areas, diametrically opposite each other, between the flex spline and the second circular spline;
wherein the wave generator has a first double row of rotating bearings and a second double row of rotating bearings, arranged in diametrically opposite areas of the wave generator, including respectively said at least one first rotating bearing and said at least one second rotating bearing;
wherein the first double row and the second double row of rotating bearings engage the internal surface of the flex spline to elastically deform the flex spline and press the first half of the external toothing of the flex spline against the internal toothing of the first circular spline and the second half of the external toothing of the flex spline against the internal toothing of the second circular spline;
wherein the second circular spline has a cylindrical body which extends axially in a cylindrical cavity of the wave generator and the wave generator is rotatably mounted on said cylindrical body of the second circular spline with interposition of at least two ball bearings arranged at a first end and a second end of the cylindrical body;
wherein the flex spline is housed in an annular space formed by the first circular spline, the second circular spline, and the wave generator; and
wherein said electric motor has a stator, fixed to said outer shell, and a rotor, fixed to the wave generator, to drive a rotation of said electric motor around the longitudinal axis of the motorized harmonic drive.

2. The motorized harmonic drive according to claim 1, wherein each of the first double row and the second double row of rotating bearings consists of three rotating bearings.

3. The motorized harmonic drive of claim 1, wherein said circular spline, said flex spline and said outer shell are entirely molded by a plastic material.

4. The motorized harmonic drive according to claim 3, wherein the plastic material is selected from a group consisting of: thermoplastic resins, thermosetting resins, filled resins, resins filled with metal powders, amorphous or semi-crystalline thermoplastic polymers, thermosetting polymers, thermoplastic or thermosetting composite polymers, polymers filled with inert or functional fillers, polymers reinforced with fibers of glass, carbon, Kevlar or natural fibers, and composite thermoplastic or thermosetting polymers filled with metal powders, ceramics, mica, talc, or inert fillers.

5. The motorized harmonic drive according to claim 4, wherein component parts of the motorized harmonic drive are made of materials including terpolymers and nano composites.

* * * * *